(12) United States Patent
Guo et al.

(10) Patent No.: US 9,047,187 B2
(45) Date of Patent: Jun. 2, 2015

(54) DEFECT MANAGEMENT IN MEMORY SYSTEMS

(75) Inventors: Xin Guo, San Jose, CA (US); Yogesh B. Wakchaure, Folsom, CA (US); Kiran Pangal, Fremont, CA (US); Hiroyuki Sanda, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 13/536,861

(22) Filed: Jun. 28, 2012

(65) Prior Publication Data

US 2014/0006847 A1 Jan. 2, 2014

(51) Int. Cl.
*G06F 11/00* (2006.01)
*G06F 11/07* (2006.01)
*G06F 11/10* (2006.01)

(52) U.S. Cl.
CPC .......... *G06F 11/073* (2013.01); *G06F 11/0727* (2013.01); *G06F 11/1016* (2013.01); *G06F 11/1068* (2013.01); *G06F 11/0793* (2013.01)

(58) Field of Classification Search
CPC ... G06F 11/07; G06F 11/073; G06F 11/0727; G06F 11/0754; G06F 11/076; G06F 11/1016; G06F 11/1068; G06F 11/1084; G06F 11/167; G06F 11/181

USPC ........ 714/6.1, 6.11, 6.13, 6.2, 6.21, 6.3, 6.31, 714/6.32, 42, 47.1, 47.2, 47.3, 53
See application file for complete search history.

(56) References Cited

U.S. PATENT DOCUMENTS

| | | | |
|---|---|---|---|
| 6,345,367 B1* | 2/2002 | Sinclair | 714/6.32 |
| 7,490,260 B2* | 2/2009 | Venkatraman et al. | 714/6.32 |
| 7,774,643 B2* | 8/2010 | Wang | 714/6.13 |
| 2004/0088477 A1* | 5/2004 | Bullen et al. | 711/109 |
| 2008/0307270 A1* | 12/2008 | Li | 714/47 |
| 2010/0157641 A1* | 6/2010 | Shalvi et al. | 365/45 |
| 2011/0302445 A1* | 12/2011 | Byom et al. | 714/6.1 |

* cited by examiner

*Primary Examiner* — Joseph D Manoskey
(74) *Attorney, Agent, or Firm* — Chapin IP Law, LLC

(57) ABSTRACT

Defect management logic extends a useful life of a memory system. For example, as discussed herein, failure detection logic detects occurrence of a failure in a memory system. Defect management logic determines a type of the failure such as whether the failure is an infant mortality type failure or a late-life type of failure. Depending on the type of failure, the defect management logic performs different operations to extend the useful life of the memory system. For example, for early life failures, the defect management logic can retire a portion of the block including the failure. For late life failures, due to excessive reads/writes, the defect management logic can convert the failing block from operating in a first bit-per-cell storage density mode to operating in a second bit-per-cell storage density mode.

34 Claims, 10 Drawing Sheets

DEFECT MANAGEMENT IN MEMORY SYSTEMS

TECHNICAL FIELD

Embodiments of the present disclosure relate generally to memory management.

BACKGROUND

Computer systems have long used memory devices to store data. One reason for the widespread use of non-volatile memory in lieu of disk drives is speed. For example, access to data in non-volatile memory is typically much quicker than access to data stored in a disk (e.g., a physically rotating storage medium). A downside of using non-volatile memory as opposed to disk drive storage is cost. For example, the cost per bit to store data in memory can be considerably higher than the cost per bit to store data in a disk drive.

Computer systems typically include some sort of memory management function to keep track of and provide access to the data stored at different locations in the non-volatile memory system. Such a memory management task can be rather complex, especially since the size and need for larger memory systems has escalated over the years.

Memory systems typically include many storage elements to store bits of information. Any of the many storage elements can fail over the useful life of the memory system. Proper management of the failing elements in the memory system is important for longevity and usefulness.

DESCRIPTION OF THE EMBODIMENTS

Figure 1:
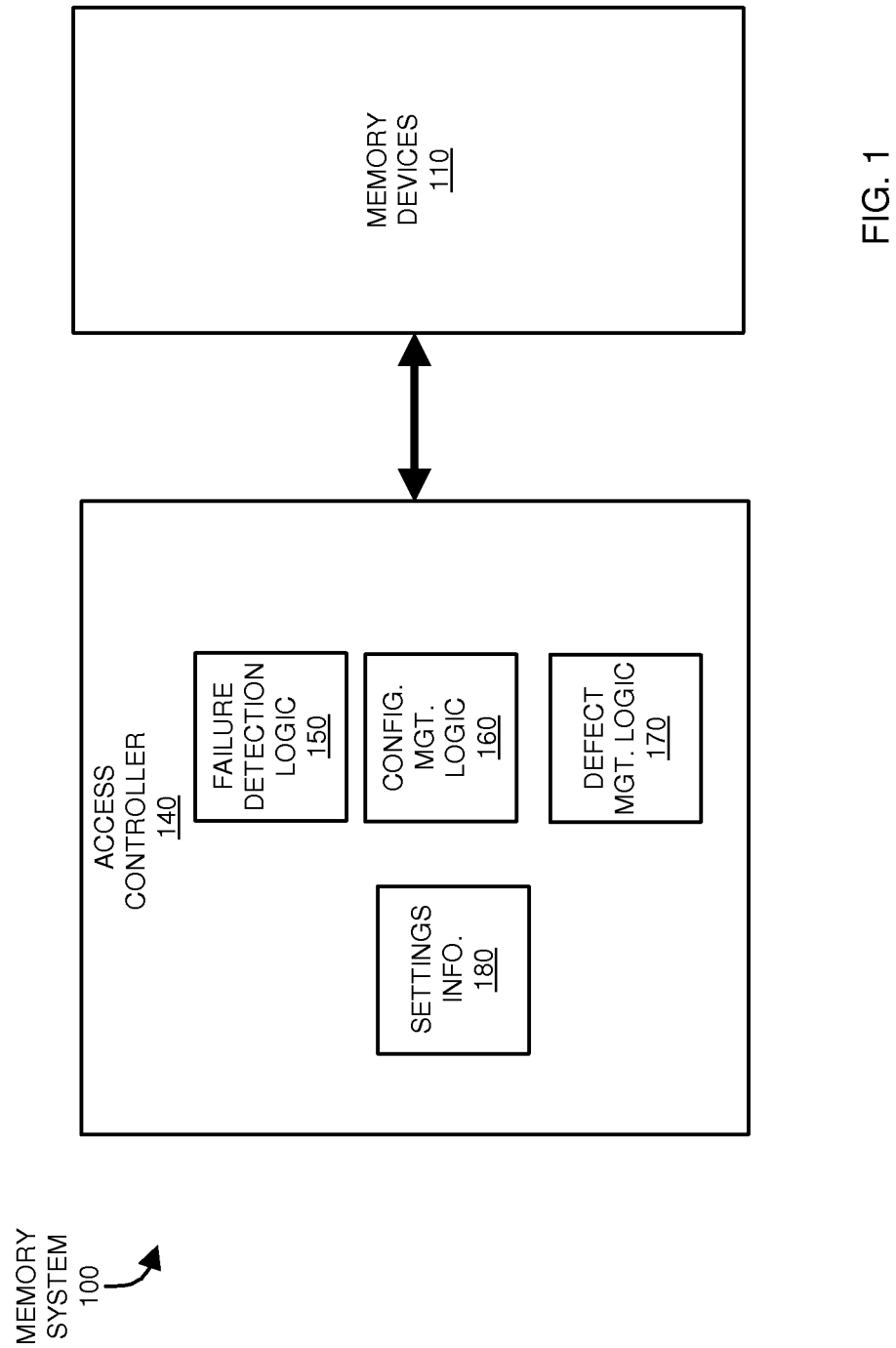
FIG. 1 is an example diagram illustrating a non-volatile memory system according to embodiments herein.

Memory systems such as those including one or more non-volatile memory devices are prone to failure for a number of reasons.

For example, memory devices are prone to failures that occur as a result of fabrication defects. Fabrication defects (e.g., extrinsic-type failures) can be caused by exposure of a die to particles, scratches on the die, etc. Typically, these types of failures occur early in a life of the memory device.

Memory systems are also prone to late life type of failures (e.g., intrinsic-type failures). For example, memory systems are typically designed to handle repeated (e.g., many thousands of) read/writes before occurrence of a failure. However, a high number of repeated accesses to the same memory cell can wear out an oxide layer of a floating gate in a cell, resulting in the inability to store data in the cell. Thus, eventually, an excessive number of accesses will cause a respective cell to fail.

One function of a memory management function can be to identify one or more bad storage cells in the memory system that cannot be used to properly store data. In such an instance, as in conventional applications, a memory management function retires (i.e., discontinues use of) a whole block in which the failure resides. A whole block of multiple storage cells is typically retired when respective error correction codes (ECCs) associated with the block are incapable of correcting bad cells in the block. However, retiring large blocks of data can be undesirable because the retired block may include many memory cells that still function properly.

Conventional SSD (Solid State Drive) technology is a data storage device that uses integrated circuit assemblies as memory to persistently store data. SSD technology is typically compatible with traditional block input/output (I/O) hard disk drives, but does not employ any moving mechanical components, which distinguishes them from traditional magnetic disks such as spinning optical disk drives. In accordance with, conventional SSD (Solid State Drive) type architectures, if a block fails for any of multiple flash operations (program, erase, or read) due to an intrinsic-type failure, then that whole block in which the failure occurred is retired and thus removed from an available memory pool. But if the failure is due to an extrinsic-type failure, usually part of the NAND block may be functioning properly. One type of extrinsic-type failure is a WL-WL (Word-Line-Word-Line) defect issue, where two adjacent WLs (WordLines) in a block are non-functional but the rest of the block still functions normally. Retiring the whole block in this instance reduces the effective usage of the NAND memory available.

If the failure is of an intrinsic type, according to further conventional techniques, the block may be unreliable in current mode of operation (multi-level cell mode or 3 bit-per-cell storage density mode), but may continue to operate reliably in a lower density mode (such as a single level cell mode or 1.5 bit-per-cell storage density mode). Retiring the whole block in this case is undesirable because the failing block may still operate in a lower bit-per-cell storage density mode.

Embodiments herein are directed to extending a useful life of a memory system via novel defect management techniques. For example, as discussed below in more detail, an access controller can be configured to detect occurrence of a failure in a memory system. The failure may occur in a single storage cell (including multiple levels) that stores multiple bits of data.

In one non-limiting example embodiment, the access controller as discussed herein determines a type of the failure such as whether a respective failure is an infant mortality type failure or a late-life type of failure. Infant mortality refers to failures that occur early in the life of a product; late-life failures refer to failures that occur due to old age or excessive usage. Depending on the type of failure, the defect management logic performs different operations to extend the useful life of the memory system.

For example, for early life failures, the defect management logic can retire a portion of the block including the failure such as one or more bad cells. For late life failures, the defect management logic can convert the failing block from operating in a first bit-per-cell storage density mode to a second bit-per-cell storage density mode, the second bit-per-cell storage density mode being lower than the first bit-per-cell storage density mode. In other words, in this latter case of changing the cell storage density mode of a block, the defect management logic configures a block to switchover from operating in a first mode in which each storage cell in a block stores N bits per cell to a second mode in which the each cell stores fewer than N bits per storage cell.

Both of these solutions alleviate the need to retire a whole block of cells in which the failure occurs.

Now, more specifically, FIG. 1 is an example diagram illustrating an implementation of a memory system, for example an SSD, according to embodiments herein.

As shown, example memory system 100 includes an access controller 140 and one or more memory devices 110. Access controller 140 includes failure detection logic 150, configuration management logic 160, and defect management logic 170. Access controller 140 also includes settings information 180.

The memory system 100 can include hardware, software, firmware, etc., to perform the functions (e.g., failure detection logic 150, configuration management logic 160, defect management logic 170, storage of settings information 180, etc.) as discussed herein.

More specifically, each of the resources disclosed in FIG. 1 can be any suitable type of resource. For example, the memory devices 110 can be non-volatile type memory devices (e.g., NAND flash, NOR flash, Magnetoresistive Random Access Memory, Ferroelectric Random Access Memory, personal computer memory system, etc.) or any type of non-volatile memory that stores data. The access controller 140 and its components can be executed via any suitable type of resource such as a as an ASIC (Application Specific Integrated Circuit), processor executing instructions, firmware, hardware, software, etc.

As discussed herein, in general, the failure detection logic 150 detects occurrence of a memory access failure in the one or more memory devices 110. The defect management logic 170 processes the memory access failure and determines how to reconfigure the memory devices 110 in light of the detected access failure. The configuration management logic 160 updates settings information 180 to reflect a present configuration for storing data in the memory devices 110.

The access controller 140 uses the settings information 180 to determine parameters such as a partitioning of the memory devices 110, operational mode setting of the memory devices 110, etc. Accordingly, the settings information 180 enable the access controller 140 to access to the memory devices 110 depending on a current configuration.

As discussed in more detail below, the defect management logic initiates reconfiguration of the memory devices 110 in different ways depending on detection of different memory element failures. Certain types of the memory failures can be corrected via error correction techniques. For example, portions of storage in the memory devices 110 or auxiliary devices can be allocated to correct defective memory elements via storage of an error correction code for a portion of stored data. However, eventually, the error correction code can no longer be used when the number of errors for the portion exceeds a threshold value. In such an instance, to remedy the error, and allow continued use of the memory system including the memory devices 110, the defect management logic 170 reconfigures portions of the memory devices 110 depending on the type of failure as discussed below.

Figure 2:
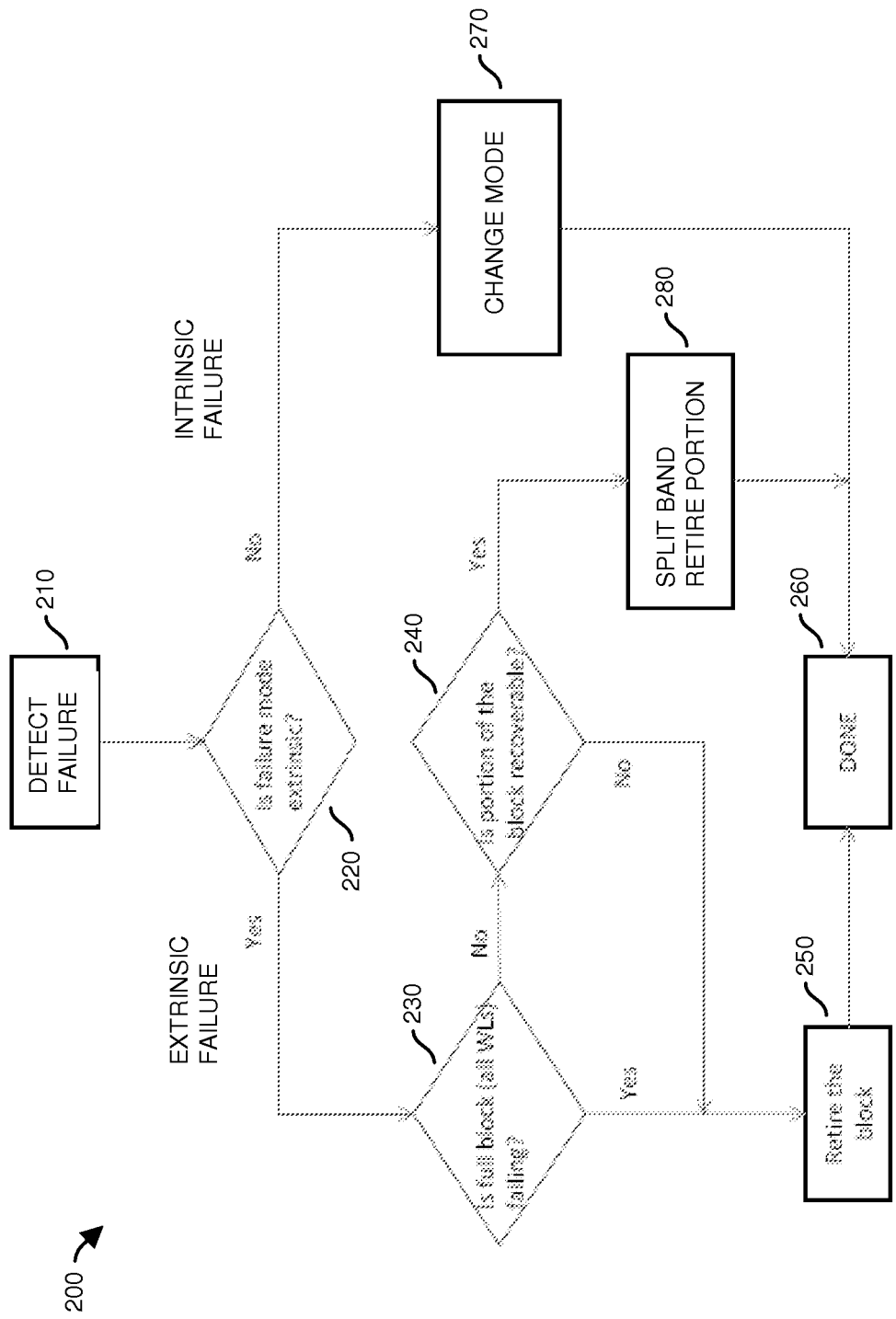
FIG. 2 is an example diagram illustrating a method of managing one or more defects according to embodiments herein.

FIG. 2 is an example diagram illustrating a method of managing memory defects according to embodiments herein.

By way of a non-limiting example, the memory devices 110 can be non-volatile memory devices having limited erase/program capability. NAND fail modes include intrinsic-type failures and extrinsic-type failures. As mentioned, intrinsic-type failures typically occur due to the wear out of an oxide surrounding the FG (Floating Gate) of a respective memory element, whereas extrinsic-type failures occur mainly due to fabrication defects caused by exposure of a respective memory die to particles, scratches on a memory die, etc.

As discussed above, conventional block retirement techniques retire a complete block (e.g., a predefined number of storage cells) in response to detecting a memory access failure. In other words, according to conventional techniques, an entire block is retired for use due to a failure even though only a portion of the block may be defective.

This disclosure includes a discovery that a portion of a failing block can still be used based on appropriately reconfiguring the memory devices 110 in view of the detected one or more failures. In accordance with embodiments herein, a certain amount of overhead resources such as settings information 180 are needed to keep track of the different reconfigurations of the memory system as it changes over time depending on the detected failures. However, the defect management techniques as discussed herein enable a continued, more efficient use of memory resources.

Embodiments herein can include implementing so-called partial block mapping. Via partial block mapping as discussed herein, a band (e.g., as discussed below in example FIGS. 3 and 5, a stripe across multiple memory devices initially including a block from each of the memory devices) can be mapped at a sub-block level as opposed to at the block level. This can be done dynamically whenever there is a defect or failure on a given band—a band may include one or more blocks from each of multiple different devices. Defect management can further include modifying parameters such as partitioning of bands, partitioning of blocks, adjusting a size and/or number of bands, changing operational modes of blocks, etc., to accommodate the detected one or more access failures.

More specifically, in processing block 210 of flowchart 200, the failure detection logic 150 receives notification of a failure in one or more of memory devices 110. The failure can be of any suitable type such as a write failure, read failure, etc.

In one embodiment, the access controller attempts to execute a command such as a read or write with respect to a specific location in a memory device. The failure detection logic 150 can receive a pass/fail indication with respect to the execution of the command. For example, the command can be a write command. The failure detection logic 150 receives a failure notification when the write command to a particular location fails. The command may be a read command. The read command may fail due to corruption of stored data.

A failure can be detected during a write command based on verifying that data written to the storage cell matches the data written in a recent write cycle. A failure can be detected during a read command. For example, every time data is written to the non-volatile memory, data can be passed through failure detection logic 150 that creates a unique signature for the stored data. The unique signature and data can be stored in the non-volatile memory. When reading back, both data and stored unique signature are read by the failure detection logic 150. The failure detection logic 150 creates a new signature for the read data. The newly created signature is then compared to the stored signature. If there is a difference between the newly created signature and the stored signature, then a data storage failure has occurred. If not, there is no failure. The failure detection logic 150 can report the failure as a pass fail bit.

Assume in this example that the failure detection logic 150 detects occurrence of an access failure. The access failure can be caused by a failed read command, failed write commands, etc., with respect to a particular block in the memory devices 150.

The decision whether the failure is an extrinsic-type access failure or an intrinsic-type failure can be based on fail parameters such as cycle count for the block (such as the number of previous accesses to the block), fail type, fail signature, severity of the fail mode, etc.

In one embodiment, the failure detection logic 150 has access to status information that keeps track of the fail parameters for the access failure. As mentioned, the fail parameters can include a cycle count value indicating a number of times each of the portions such as blocks of the memory devices 110 have been accessed.

As an example, the access controller 140 can include a counter for each block in the memory system 100; the counter keeps track of a number of previous accesses to the block. Via the counter information, and/or other fail parameters, the failure detection logic 150 determines the type of access failure (e.g., intrinsic-type failure, extrinsic-type failure, etc.).

In processing block 220, the failure detection logic 150 determines a type of the access failure. For example, assume in this example that the failure detection logic 150 accesses status information (e.g., counter information) indicating the number of access to the block in which the failure occurred. The failure detection logic 150 compares the count information for the failing block to a threshold value.

If the count information for the failing block is less than a threshold value (i.e., the block has been accessed relatively few times), the failure detection logic 150 categorizes the current access failure as an extrinsic-type failure due to infant mortality.

On the other hand, if the count information for the failing block is greater than a threshold value (i.e., the block has been accessed relatively few times), the failure detection logic 150 categorizes the current access failure as an intrinsic-type failure due occurring near an end of life of the block.

Note that the threshold value can be any suitable value that varies depending on the embodiment and the type associated with memory devices 110.

Assume in this example that the failure detection logic 150 classifies the detected access failure as an extrinsic-type of access failure. In such an instance, in processing block 230, the failure detection logic 150 verifies operation of all word lines in the block in which the access failure was detected. If the entire block fails a validation test or check test (e.g., no word-line in the block under test can be used to properly store data), the failure detection logic 150 notifies the defect management logic 170 to retire the entire block in processing block 250. On the other hand, if in processing block 230, the failure detection logic 150 determines that not all word lines are failing, the failure detection logic 150 executes processing block 240. In processing block 240, the failure detection logic 150 determines which, if any, portions of a respective block are able to properly store data. If no portions of the block are functional, the failure detection logic notifies the defect management logic 170 to retire the block. Alternatively, if in processing block 240, the failure detection logic 150 determines that one or more portions of the block are still usable despite at least a portion failing due to the failure, the failure detection logic 150 provides such notification to the defect management logic 170.

Thus, the defect management logic 170 can verify an ability to store data in the block at locations other than where the access failure occurred. As further discussed, the defect management logic 170 may initiate retiring only a portion of the failed block in response to detecting that accesses to at least a portion of the block functions properly to store data.

In processing block 280, after receiving notification from the failure detection logic 150 that at least portions of the failed block are still usable despite the access failure, the defect management logic 170 initiates splitting of a band (and also splitting of the block) and retires a portion of the block in which the access failure occurred. This is shown and discussed in more detail with respect to FIGS. 3 and 4 below.

Figure 3:
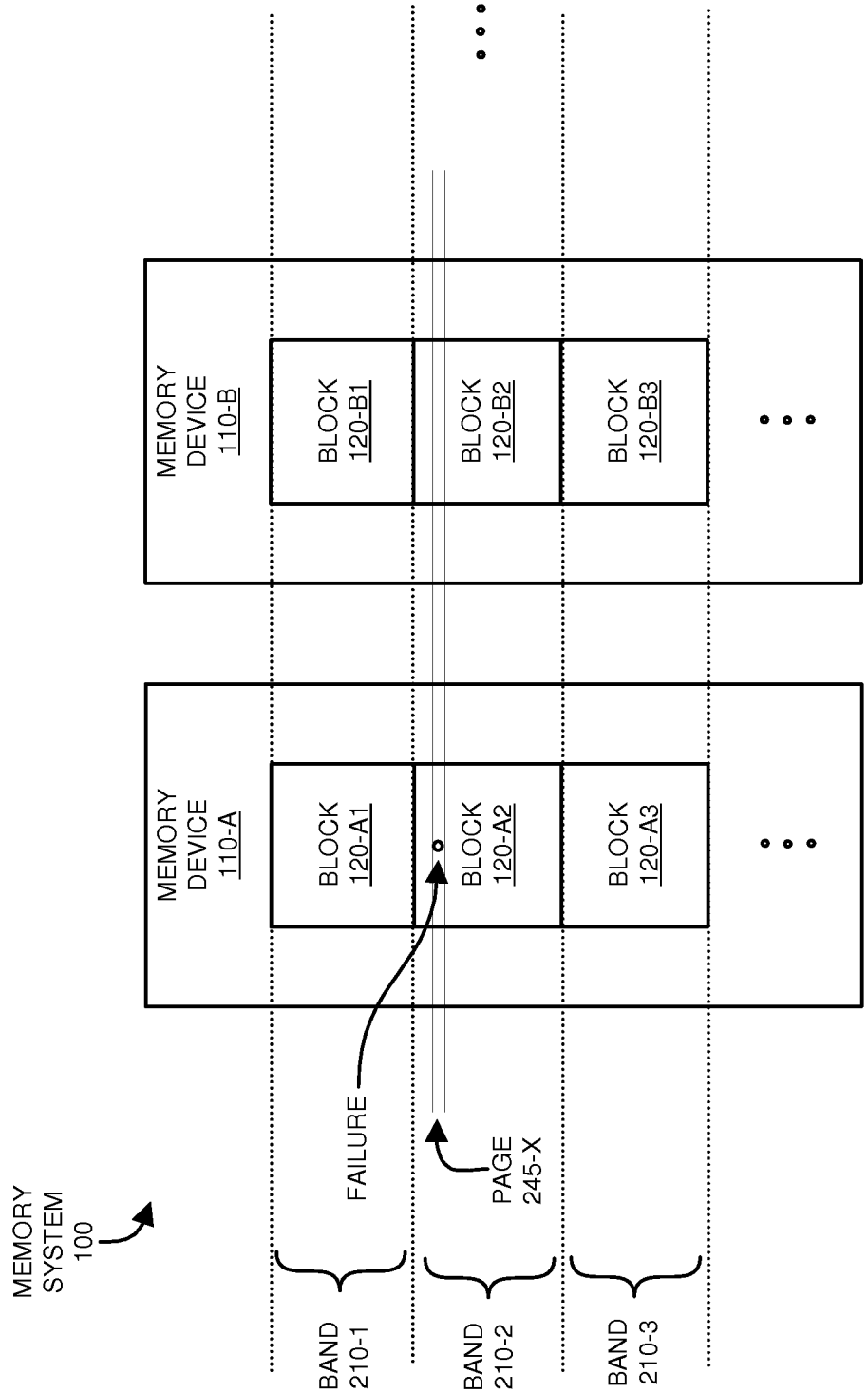
FIG. 3 is an example diagram illustrating a memory system according to embodiments herein.

FIG. 3 is an example diagram illustrating a configuration of memory devices according to embodiments herein.

As shown, the more specifically 100 includes memory device 110-A, memory device 110-B, etc. The memory system 100 can include a string of any suitable number of memory devices 100.

Each of the memory devices 110 includes multiple blocks of memory cells or memory elements to store respective bits of data.

In one embodiment, the memory elements in each block are multi-level cells, each of which is capable of storing multiple bits of data. The blocks can be partitioned to include multiple pages. Each page includes multiple cells to store multiple bits of data. As mentioned, each cell can store multiple bits of data depending on a bit-per-cell storage density mode setting.

The storage resources in the memory devices 110 can be striped as shown with bands 210 (e.g., band 210-1, band 210-2, band 210-3, etc.). Each of the bands 210 includes multiple blocks. Each band can include a block from each memory device 110.

Each of the bands can define a contiguous range of pages forming a block. For example, the band can span a physical range of addresses common to each of the memory device. Each of the memory devices can be driven with a respective chip enable signal (e.g., based on upper address lines) to indicate a current one or more block in the band that is being accessed.

As shown in this example embodiment, the band 210-1 includes: block 120-A1 of memory device 110-A, block 120-B1 of memory device 110-B, and so on. The band 210-2 includes: block 120-A2 of memory device 110-A, block 120-B2 of memory device 110-B, and so on. The band 210-3 includes: block 120-A3 of memory device 110-A, block 120-B3 of memory device 110-B, and so on.

Each band can be of the same size or of different size. As discussed herein, the number of bands can be modified to account for defective memory elements. Settings information 180 keeps track of the ranges of the bands 210.

Assume in this example that the access controller 140 attempts to access page 245-X in block 120-A2. In a manner as previously discussed, the failure detection logic 150 detects a location of the access failure and determines whether the access failure is an intrinsic-type of failure or an extrinsic-type of failure. Assume in this example that the failure detection logic 150 determines that the access failure is an extrinsic-type of access failure and that one or more portions of the memory in block 120-A2 (other than where the access failure occurred) is recoverable.

In one embodiment, to remedy the access failure, the defect management logic 170 splits the band 210-2.

The defect management logic 170 can split the band into any suitable number of sub-bands. If the block 120-A1 includes 128 pages, the defect management logic can split the band up into as many as 128 sub-bands. In other words, the band can be split to the page level, word-line level, etc.

Splitting the band up into more sub-bands requires more overhead resources to keep track of the splits. Thus, there are tradeoffs to consider when determining how many ways a band should be split.

Figure 4:
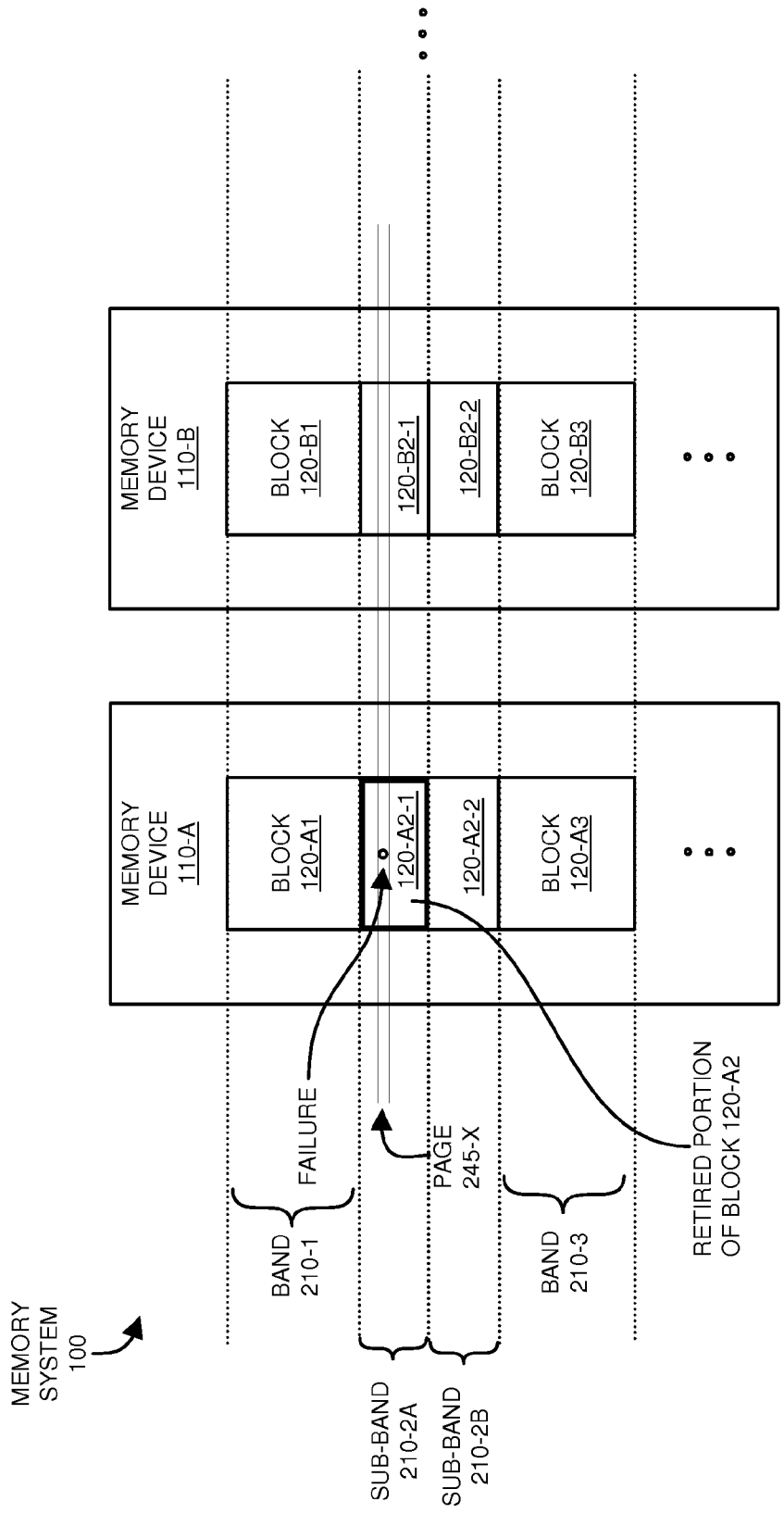
FIG. 4 is an example diagram illustrating splitting of a band and retiring of a portion of the split block according to embodiments herein.

FIG. 4 is an example diagram illustrating reconfiguration of a memory system according to embodiments herein.

As shown, by way of a non-limiting example, assume in this example that the defect management logic 170 splits the band 210-2 into sub-band 210-2A and sub-band 210-2B. Splitting the band 210 causes each of the blocks 120-A1, block 120-A2, etc., to be split as shown into sub-blocks. For example, block 120-A1 is split into sub-block 120-A1-1 and sub-block 120-A1-2; block 120-A1 is split into sub-block 120-A1-1 and sub-block 120-A1-2; and so on.

By way of a non-limiting example, splitting of the band include physical partitioning of the band 210 based on physical addresses. That is, certain cells of the split block will reside in one sub-band while other portions of the block will reside in another sub-band after the band partitioning.

The defect management logic 170 can receive notification from the failure detection logic 150 where the access failure occurred in the block 120-A2. Based on where the access failure occurs, the defect management logic 170 chooses which of the one or more sub-blocks to retire from further use.

In this example, the defect management logic 170 receives an indication or determines that the access failure occurred in sub-block 120-A2-1. Accordingly, the defect management logic 170 retires sub-block 120-A2-1 such that the access controller 140 no longer attempts to or has access to this sub-block. The sub-block 120-A2-2 is still usable. In other words, the defect management logic 170 retires the sub-block 120-A2-1 from further use and configures the sub-block 120-A2-2 for continued use to store data.

In one embodiment, the defect management logic 170 notifies the configuration management logic 160 to retire sub-band 120-A2-1 from further use. The configuration management logic 160 also receives notification of the splitting of the band 210-1 into multiple sub-bands 210-2A and 210-2B.

In response to the notifications, the configuration management logic 160 updates settings information 180 to indicate that the sub-block 120-A2-1 has been retired and the new partitioning of band 210-2. As mentioned, the settings information 180 keeps track of the different sized bands, different sized blocks, sub-blocks, etc., associated with memory devices 110.

Thus, settings information 180 indicates a current configuration of the storage devices 110. Via the settings information 180, the access controller 140 is able to identify which portions of the memory devices 110 are available for access.

Thus, when a block fails, the corresponding band can be split into multiple sub-bands. The sub-bands can be of any size, but smaller sized sub-band typically ensures better memory utilization.

Any suitable type of memory device architecture can be used to carry out embodiments herein. When the memory devices 110 are 3 dimensional type NAND flash memory devices, the respective memory array can be tiled (e.g., each block can be broken up into smaller groupings of memory storage cells). A logical block as discussed herein can include multiple tiles. Each tile in the NAND flash memory device can be erased independently. Thus, a failing block can be remapped to tile granularity and instead of block retirement.

Since each tile can be erased independently, data migration and garbage collection methods typically will not require any significant changes. Thus, partial block mapping as discussed herein can be used in any suitable type of resource including 3-dimensional type NAND memory devices.

Referring again to FIG. 2, assume in processing block 220 that the failure detection logic 150 determines that the access failure is an intrinsic-type access failure, instead of an extrinsic-type of failure as discussed above.

In one embodiment this includes detecting that the number of recorded previous accesses to the failed block is greater than a threshold value. In this instance, the failure detection logic 150 classifies the access failure as an intrinsic-type of access failure, which occurs near an end of life of the block. In other words, the failure in this instance is most likely caused by an excessive number of previous accesses to the block and/or storage cell.

The failure detection logic 150 notifies the defect management logic 170 that the detected access failure was caused by excessive use and is likely an end-of-life type failure.

In processing block 270, in response to receiving the notification that the current access failure is an intrinsic-type of access failure, the defect management logic 170 marks the failing block for conversion from a first bit-per-cell storage density mode to a second bit-per-cell storage density mode.

By way of a non-limiting example, the conversion of the failed block from operating in the multi-level cell mode (such as a first bit-per-cell storage density mode) to the single level cell mode (such as a second bit-per-cell storage density mode) can take place at any suitable time such as during a next erase cycle. Further details of reconfiguring the memory devices in view of an intrinsic-type access failure are shown in FIGS. 5 and 6 below.

Figure 5:
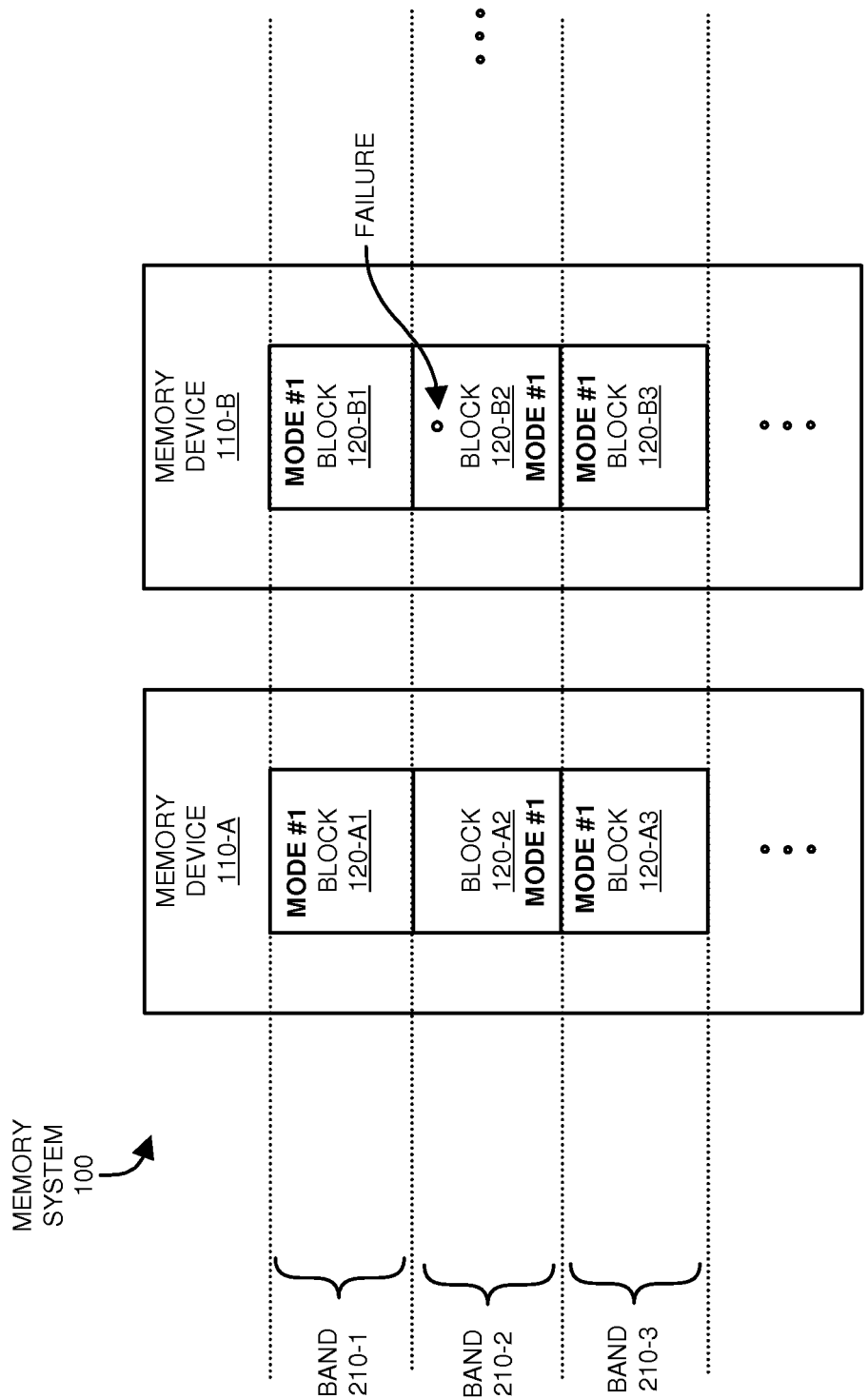
FIG. 5 is an example diagram illustrating a memory system and detection of a failure according to embodiments herein.
Figure 6:
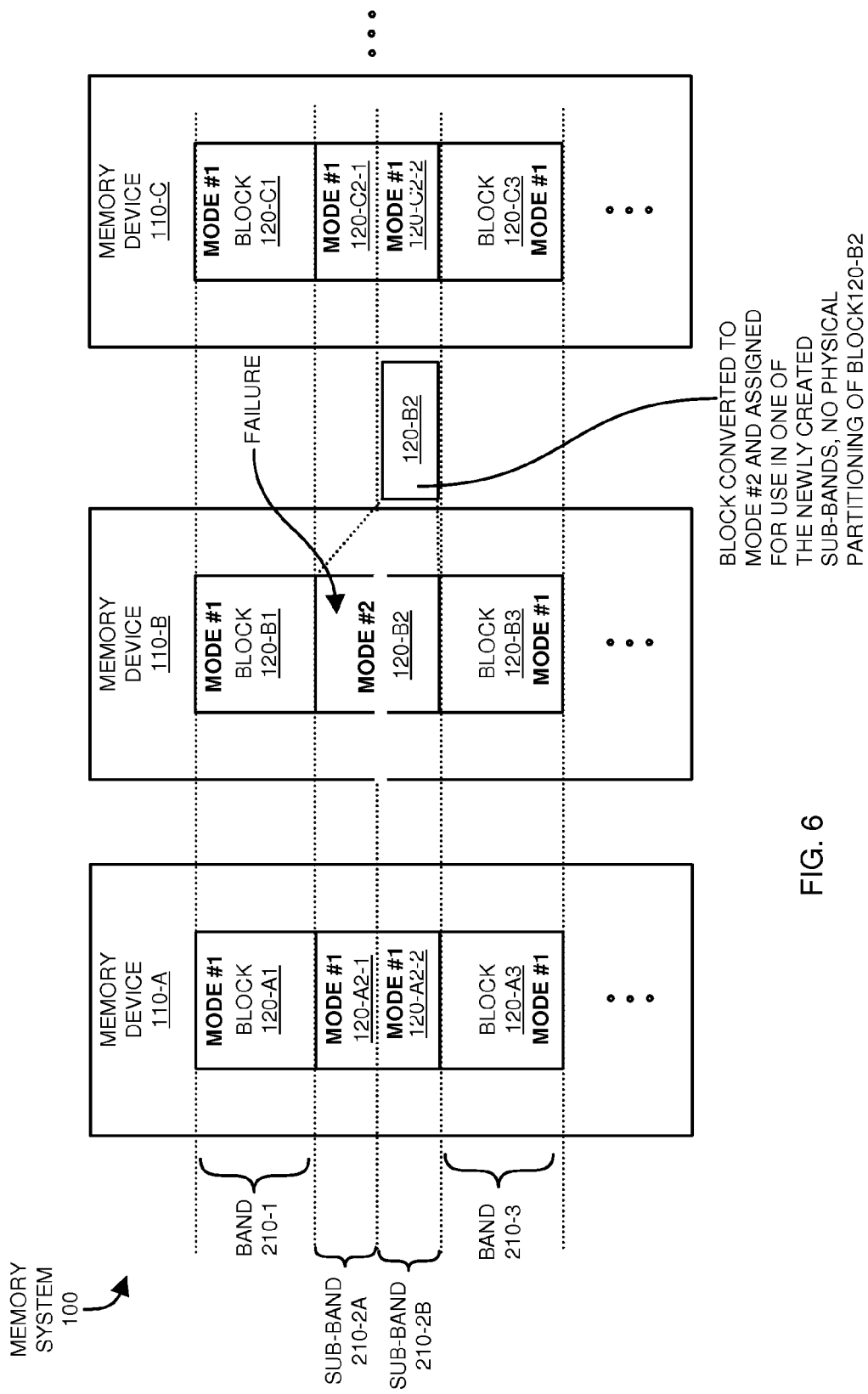
FIG. 6 is an example diagram illustrating partitioning of a band and setting of modes according to embodiments herein.

FIG. 5 is an example diagram illustrating a configuration of memory devices according to embodiments herein.

As shown, the memory system 100 includes memory device 110-A, memory device 110-B, etc. The memory system 100 can include a string of any suitable number of memory devices 100 as previously discussed.

Each memory device in memory system 100 includes multiple blocks of memory cells or memory elements to store respective bits of data. In one embodiment, the memory elements (such as cells) in each block are multi-level cells, each of which is capable of storing multiple bits of data. The blocks can be partitioned to include multiple pages. Each page includes multiple memory elements (e.g., cells) to store multiple bits of data.

The storage resources in the memory devices 110 can be striped as shown with bands 210 (e.g., band 210-1, band 210-2, band 210-3, etc.). Each of the bands 210 includes multiple blocks. Each band can include a block from each memory device 110.

As shown in this example embodiment, the band 210-1 includes: block 120-A1 of memory device 110-A, block 120-B1 of memory device 110-B, and so on. The band 210-2 includes: block 120-A2 of memory device 110-A, block 120-B2 of memory device 110-B, and so on. The band 210-3 includes: block 120-A3 of memory device 110-A, block 120-B3 of memory device 110-B, and so on.

In this example, assume that each of the blocks is set to operate in the first bit-per-cell storage density mode. In such a mode, each cell in the memory devices stores multiple bits of data.

Further in this example, the access controller 140 accesses block 120-B2, causing a failure.

In a manner as previously discussed, the failure detection logic 150 detects the access failure and determines whether the access failure is an intrinsic-type of failure or an extrinsic-type of failure.

Assume in this example that the failure detection logic 150 determines that the access failure is an intrinsic-type of access failure. In such an instance, to remedy the access failure, the defect management logic 170 splits the band 210 into sub-bands 210-2A and 210-2B.

FIG. 6 is an example diagram illustrating remedial actions to correct defects according to embodiments herein.

As shown, the defect management logic 170 can split the band 210-2 (in which the failing block 120-B2 resides) into any suitable number of sub-bands.

By way of a non-limiting example, assume in this example that the defect management logic 170 splits the band 210-2 into sub-band 210-2A and sub-band 210-2B. Splitting the band 210-2 causes each of the non-failing blocks such as block 120-A2, sub-block 120-C2, etc., to be split as shown into multiple sub-blocks. For example, block 120-A2 is split into sub-block 120-A2-1 and sub-block 120-A2-2. Splitting of good blocks can be achieved via splitting of the physical addresses associated with the good blocks. Each new sub-block operates in the first bit-per-cell storage density mode.

Instead of physically splitting the failing block 120-B2 (i.e., block including the detected end of life type failure) into multiple sub-blocks along sub-band divisions, the defect management logic 170 converts the entire block 120-B2 from operating in the first bit-per-cell storage density mode to operating in a second bit-per-cell storage density mode.

Converting the setting of the block 120-B2 from the first bit-per-cell storage density mode to the second bit-per-cell storage density mode substantially increases an operational life of the block 120-B2. For example, the second bit-per-cell storage density mode may tolerate up to 10 times more lifetime accesses than does the first bit-per-cell storage density mode.

Conversion of the block 120-B2 from the multi-level cell (e.g., MLC) mode to the single level cell (e.g., SLC) mode substantially decreases an amount of available storage capacity. For example, setting the block 120-B2 to the single level cell mode can reduce the available storage capacity by a half. Because the available storage capacity is reduced, the block 120-B2 is assigned for use in either sub-band 210-2A or sub-band 210-2B.

In this example, the block 120-B2 is assigned for use in sub-band 210-2B. Thus, sub-band 210-2B includes sub-block 120-A2-2 (first bit-per-cell storage density mode), block 120-B2 (second bit-per-cell storage density mode), sub-block 120-C2-2 (first bit-per-cell storage density mode), and so on. Sub-band 210-2A includes sub-block 120-A2-1 (first bit-per-cell storage density mode), sub-block 120-C2-2 (multi-level cell storage density mode), and so on. The sub-band 210-2A may not include storage from memory device 110-B.

By setting the block 120-B2 to the second bit-per-cell storage density mode, the block 120-B2 is logically split. That is, each cell supports storage of fewer bits. The available storage capacity of block 120-B2 in the second bit-per-cell storage density mode can be substantially equivalent to the capacity for storing bit information in sub-block 120-A2-2 set to the first bit-per-cell storage density mode. Thus, in this non-limiting example, there is no physical splitting of block 120-B2. However, there is physical splitting of good blocks 120-A2, 120-C2, etc.

In one embodiment, the defect management logic 170 notifies the configuration management logic 160 of the splitting of the band 210-A into sub-bands 210-2A, 210-2B, etc., and that the block 120-B2 has been converted to the second bit-per-cell storage density mode.

In response to the notifications, the configuration management logic 160 updates settings information 180 to reflect the reconfiguration of the memory devices as discussed above.

Thus, settings information 180 indicates a current configuration of the storage devices 110. Via the settings information 180, the access controller 140 is able to identify a size of the blocks and sub-blocks, respective mode settings, etc.

Thus, in accordance with embodiments herein, a band can include a fixed block from each of multiple memory devices. In this method, when a multi-level cell type block fails, the band containing that block will be flagged. When that band completes data migration (e.g., based on wear leveling, background data refresh, etc.) the flagged band can be split into smaller bands. The failing block 120-B2 is not split, but is included in one of the newly created sub-bands.

Figure 7:
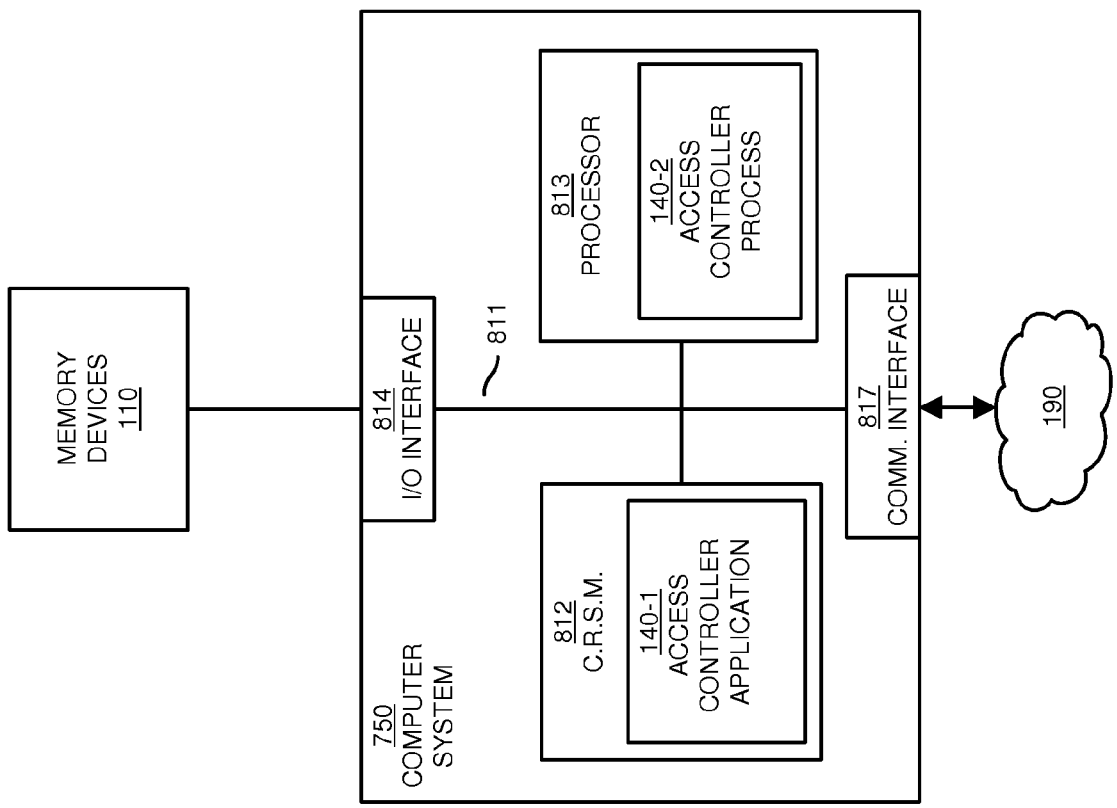
FIG. 7 is an example diagram illustrating an architecture that can be used to execute one or more methods according to embodiments herein.

FIG. 7 is an example block diagram of a computer system for implementing any of the operations as discussed herein according to embodiments herein.

Computer system 750 can be configured to execute any of the operations with respect to access controller 140 and/or corresponding resources such as failure detection logic 150, defect management logic 170, configuration management logic 160, etc.

As shown, computer system 750 of the present example can include an interconnect 811 that couples computer readable storage media 812 such as a non-transitory type of media (i.e., any type of hardware storage medium) in which digital information can be stored and retrieved, a processor 813 (i.e., one or more processor devices), I/O interface 814, and a communications interface 817.

I/O interface 814 provides connectivity to memory system 100.

Computer readable storage medium 812 can be any hardware storage device such as memory, optical storage, hard drive, floppy disk, etc. In one embodiment, the computer readable storage medium 812 (e.g., a computer readable hardware storage) stores instructions and/or data.

Communications interface 817 enables the computer system 750 and processor 813 to communicate over a resource such as network 190 to retrieve information from remote sources and communicate with other computers. I/O interface 814 enables processor 813 to retrieve stored information from a repository such as memory devices 110.

As shown, computer readable storage media 812 is encoded with access controller application 140-1 (e.g., software, firmware, etc.) executed by processor 813. Access controller application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in access controller application 140-1 stored on computer readable storage medium 812.

Execution of the access controller application 140-1 produces processing functionality such as access controller process 140-2 in processor 813. In other words, the access controller process 140-2 associated with processor 813 represents one or more aspects of executing access controller application 140-1 within or upon the processor 813 in the computer system 750.

Those skilled in the art will understand that the computer system 750 can include other processes and/or software and hardware components, such as an operating system that controls allocation and use of hardware resources, software resources, etc., to execute access controller application 140-1.

In accordance with different embodiments, note that computer system 750 may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by the different resources will now be discussed via flowcharts in FIGS. 8-9. Note that the processing in the flowcharts below can be executed in any suitable order.

Figure 8:
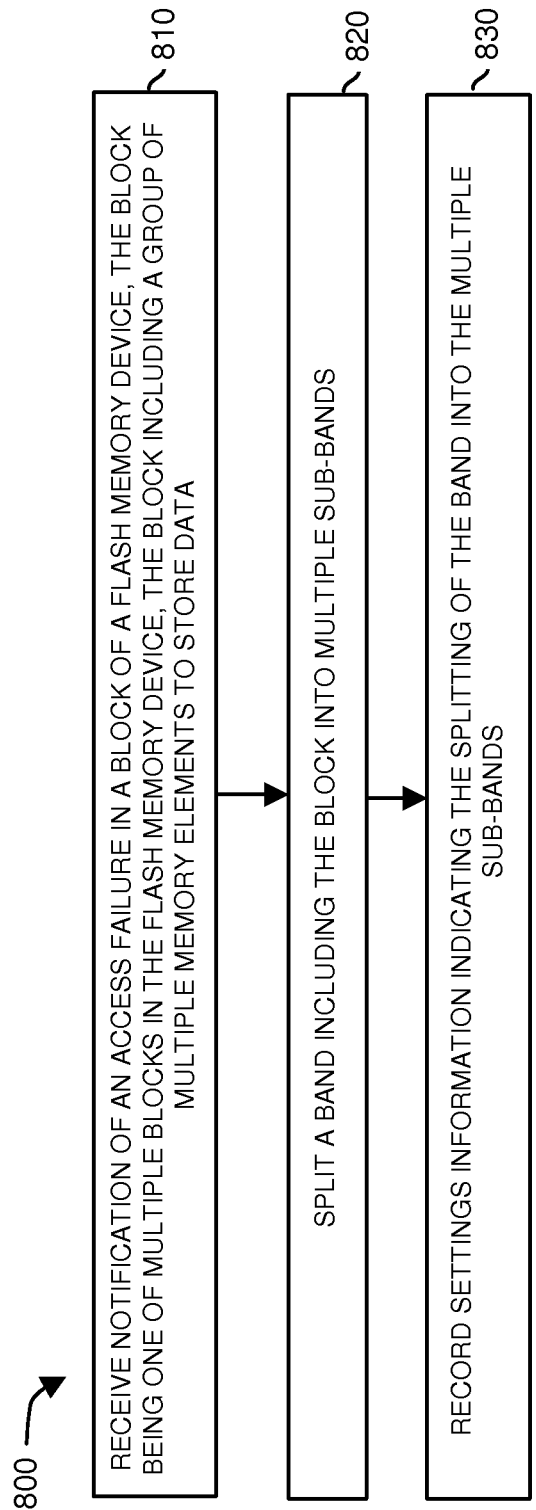
FIGS. 8 and 9 are example flowcharts illustrating methods according to embodiments herein.

FIG. 8 is a flowchart 800 illustrating an example method according to embodiments. Note that there will be some overlap with respect to concepts as discussed above.

In processing block 810, the defect management logic 170 receives notification of an access failure in a block of a non-volatile memory device, the block being one of multiple blocks in the non-volatile memory device, the block including a group of multiple memory elements to store data.

In processing block 820, the defect management logic 170 splits a band including the block into multiple sub-bands.

In processing block 830, the configuration management logic 160 records settings information 180 indicating the splitting of the band into the multiple sub-bands.

Figure 9:
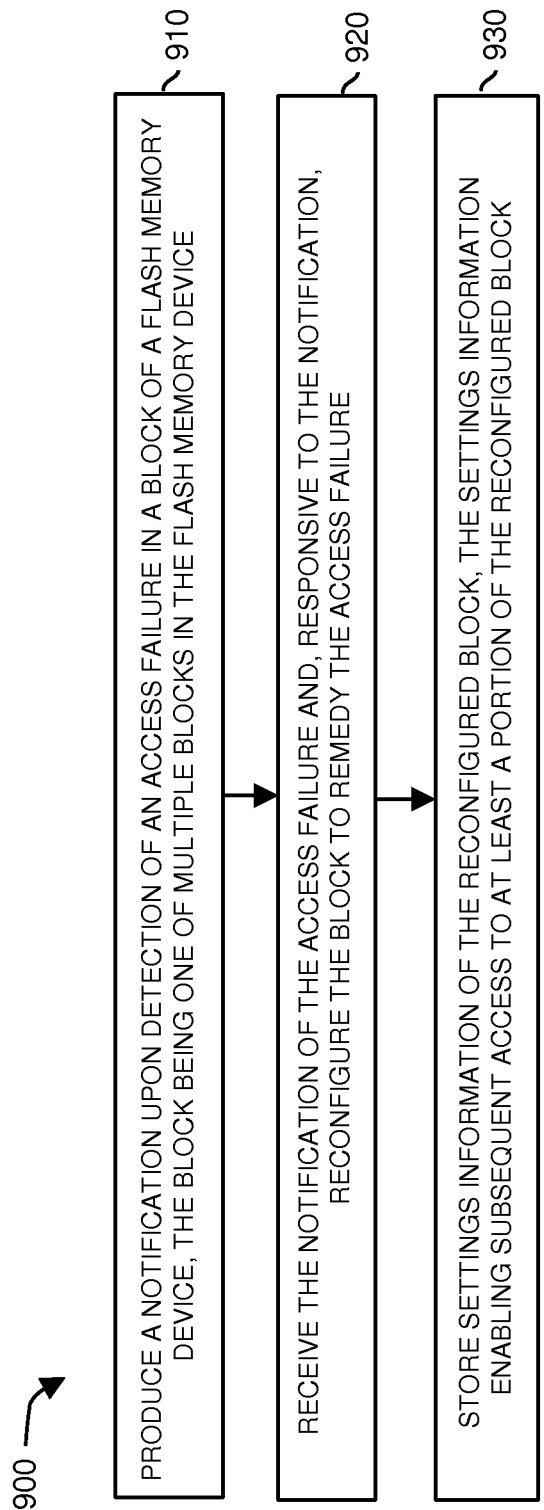

FIG. 9 is a flowchart 900 illustrating an example method according to embodiments. Note that there will be some overlap with respect to concepts as discussed above.

In processing block 910, the failure detection logic 150 produces a notification upon detection of an access failure in a block of a non-volatile memory device, the block being one of multiple blocks in the non-volatile memory device.

In processing block 920, the defect management logic 170 receives the notification of the access failure and, responsive to the notification, reconfigures the blocks to remedy the access failure.

In processing block 930, the configuration management logic 160 stores settings information 180 of the reconfigured block, the settings information 180 enable subsequent access to at least a portion of the reconfigured block.

Figure 10:
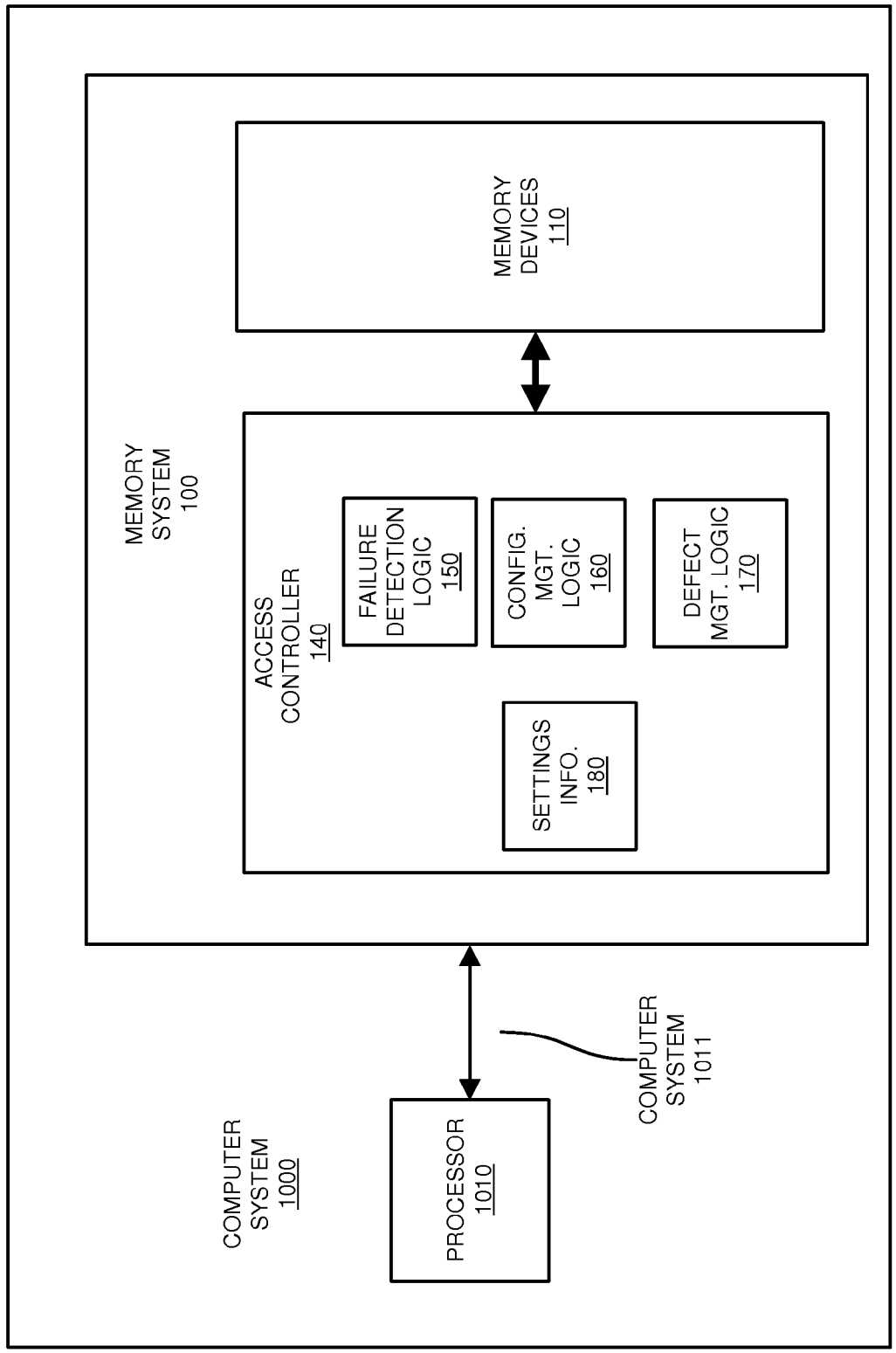
FIG. 10 is an example diagram illustrating use of a memory system in a SSD (Solid State Drive) according to embodiments herein.

FIG. 10 is an example diagram illustrating use of a memory system as a SSD (Solid State Drive) according to embodiments herein.

As shown, computer system 1000 can include a processor 1010 and memory system 100. Processor 1010 can be or include one or more processor devices. Computer system 1000 can be any suitable type of resource such as a personal computer, cellular phone, mobile device, camera, etc., using memory system 100 to store data. By way of a non-limiting example, memory system 100 can be a solid-state drive used to store data.

As previously discussed, memory system 100 can include an access controller 140 (e.g., including settings information 180, failure detection logic 150, configuration management logic 160, defect management logic 170, etc.), and one or more memory devices 110.

Processor 1010 has access to memory system 100 via interface 1011. Interface 1011 can be any suitable link enabling data transfers. For example, the interface 1011 can be a SCSI (Small Computer System Interface), SAS (Serial Attached SCSI), SATA (Serial Advanced Technology Attachment), USB (Universal Serial Bus), Pcie (Peripheral Component Interconnect Express) bus, etc.

Via interface 1011, the processor 1010 of computer system 1000 is able to convey data to access manager 140. Access controller 140, in turn, writes the data to memory devices 110.

Via interface 1011, the processor 1010 of computer system 1000 is able to retrieve data from memory devices 100. For example, the processor 1010 sends a request to the access controller 140 to retrieve data. The access controller 140 retrieves the requested data from memory devices 110 and conveys the data to processor 1010 over interface 1011.

Different Permutations of Disclosed Example Embodiments

A first example embodiment as discussed herein includes an apparatus, the apparatus comprises: a failure detection logic to produce a notification upon detection of an access failure in a block of a non-volatile memory device, the block being one of multiple blocks in the non-volatile memory device; a defect management logic to receive the notification of the access failure and, responsive to the notification, reconfigure the block to remedy the access failure; and a configuration management logic to store settings information of the reconfigured block, the settings information enabling subsequent access to at least a portion of the reconfigured block.

The first example embodiment can be implemented along with any of one or more of the following features to produce yet different embodiments:

For example, in accordance with a further embodiment, the block can reside in a band including multiple blocks; each of the multiple blocks in the sub-band can reside in a different non-volatile memory device. The defect management logic, responsive to the notification, partitions the band into multiple sub-bands.

In accordance with a further embodiment, the defect management logic can be configured to partition the block into at least a first sub-block and a second sub-block, the access failure occurring in the first sub-block. The defect management logic retires the first sub-block from further use and configures the second sub-block for continued use to store data.

In accordance with yet further embodiment, the defect management logic reconfigures the block into multiple sub-blocks and retires one of the multiple sub-blocks from further use.

In accordance with further embodiments, the defect management logic verifies an ability to store data at locations in the block at locations other than wherein the access failure occurred, the defect management logic retiring only a portion of the block in response to detecting that accesses to at least a portion of the block function properly.

In accordance with further embodiments, the defect management logic identifies a type of the access failure based on a counter value recording a number of accesses to the block and reconfigures the block depending on a magnitude of the counter value.

In yet further embodiments, the defect management logic, responsive to detecting that a number of previous accesses to the block is below a threshold value, partitions the block into multiple sub-blocks and retires a portion of the block in which the failure occurred.

In another embodiment, the defect management logic, responsive to detecting that the number of previous accesses to the block is above a threshold value, converts an operational mode of the block from a first bit-per-cell storage density mode to a second bit-per-cell storage density mode. For example, the first bit-per-cell storage density mode supports access to a first number of bits of data stored in each cell.

The second bit-per-cell storage density mode supports access to a second number of bits of data stored in each cell. The second number is smaller than the first number. That is, the second bit-per-cell storage density mode supports storage of fewer bits-per-cell than does the first bit-per-cell storage density mode. Thus, the first bit-per-cell storage density mode enables a respective block (or sub-block) to store more data than does the respective block (or sub-block) in the second bit-per-cell storage density mode.

In accordance with further embodiments, the defect management logic can be configured to convert an operational mode of the block from one mode (e.g., a multi-level cell mode) to another mode (e.g., a single level cell mode) and split a band in which the block resides into multiple sub-bands.

In an example embodiment, the defect management logic assigns the block, which has been converted into the second bit-per-cell mode such as a lower bit-per-cell storage density mode, for use in one of the multiple sub-bands.

The first example embodiment can be implemented to execute any of the method operations as discussed herein.

A second example embodiment as discussed herein includes a method, the method comprises: detecting an access failure in a block of a non-volatile memory device, the block being one of multiple blocks in the non-volatile memory device; responsive to detecting the access failure, reconfigure the block in the non-volatile memory device to remedy the access failure; and store settings of the reconfigured block, the settings enabling subsequent access to at least a portion of the reconfigured block.

The second example embodiment can be implemented along with any of one or more of the following features to produce yet further embodiments:

In one embodiment, the second embodiment can be configured to further include: identifying a band in which the block resides, the band including multiple blocks, each of the multiple block in the band residing in a different non-volatile memory device; and partitioning the band into multiple sub-bands.

In another example embodiment, the second embodiment can be configured to further include: reconfiguring the block into multiple sub-blocks; identifying a sub-block where the access failure occurred; and retiring the identified sub-block from further use.

In another example embodiment, the second embodiment can be configured to further include: changing an operational mode of the block from a first bit-per-cell storage density mode to a second bit-per-cell storage density mode; and splitting a band in which the block resides into multiple sub-bands.

A third example embodiment as discussed herein includes a method, the method comprises: receiving notification of an access failure in a block of a non-volatile memory device, the block being one of multiple blocks in the non-volatile memory device, the block including a group of multiple memory elements to store data; splitting a band including the block into multiple sub-bands; and recording settings information indicating the splitting of the band into the multiple sub-bands.

The third example method embodiment can be implemented along with any of one or more of the following features to produce yet further embodiments:

For example, splitting the band can include: partitioning the block into at least a first sub-block and a second sub-block, the access failure occurring in the first sub-block.

The method embodiment can further include: recording status information indicating that the first sub-block in one of the multiple sub-bands has been retired from further access.

In one embodiment, splitting the band further includes: partitioning multiple blocks residing in the band, each of the multiple blocks residing in a different non-volatile memory device.

In accordance with yet further embodiments, the method can further include: splitting the band into at least a first sub-band and a second sub-band, the access failure occurring in a portion of the block in the first sub-band; and preventing further access to the portion of the block in the first sub-band.

In accordance with another embodiment, the method can further include: splitting the band subsequent to detecting that at least a portion of the block properly functions to store data.

In yet another embodiment, the method can include: identifying a type of the failure based on a number of accesses to the block; and partitioning the block into multiple sub-blocks and retiring a portion of the block in which the failure occurred in response to detecting that the failure is an infant mortality failure.

In a further embodiment, the method includes: retrieving status information indicating a number of accesses to the block; and converting the block from a first bit-per-cell storage density mode to a second bit-per-cell storage density mode depending on the number of accesses.

In yet another example embodiment, the method can further include: assigning the block, which has been converted into the second bit-per-cell storage density mode, for use in one of the multiple sub-bands.

Another method embodiment as discussed herein includes: splitting multiple blocks residing in the band, each of the multiple blocks residing in a different non-volatile memory device and being set to operate in a first bit-per-cell storage density mode; setting the block with the failure to operate in a second bit-per-cell storage density mode; and setting the split multiple blocks to operate in a first bit-per-cell storage density mode.

In yet a further embodiment, the method includes: accessing status information indicating a number of defective memory elements in the block; and splitting the band into multiple sub-bands in response to detecting that the number of defective memory elements in the block exceeds a defective memory element count threshold value.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs, firmware, logic, etc. to perform operations as disclosed herein. One such embodiment comprises a computer program product including a non-transitory computer-readable storage medium (i.e., any computer readable hardware storage medium) on which software instructions are encoded for subsequent execution. The instructions, when executed in a computerized device having one or more processors, program and/or cause the processor to perform the operations disclosed herein. Such arrangements can be provided as software, firmware, code, instructions, data (e.g., data structures), etc., arranged or encoded on a non-transitory computer readable storage medium such as an optical medium (e.g., CD-ROM), floppy disk, hard disk, memory, etc., or other a medium such as firmware or shortcode in one or more ROM, RAM, PROM, etc., or as logic in an Application Specific Integrated Circuit (ASIC), etc. The software or firmware or other such configurations can be installed onto a computerized device to cause the computerized device to perform the techniques explained herein.

Accordingly, embodiments herein are directed to an apparatus, a method, a system, a computer program product, etc., that supports operations as discussed herein.

One embodiment includes a computer readable storage medium and/or system having instructions, logic, etc., stored thereon to manage defects in a memory system including one or more non-volatile memory devices. The instructions, and/or logic, when executed by at least one processor device of a respective computer, cause the at least one processor device to: detect an access failure in a block of a non-volatile memory device, the block being one of multiple blocks in the non-volatile memory device; responsive to detecting the access failure, reconfigure the block in the non-volatile memory device to remedy the access failure; and store settings of the reconfigured block, the settings enabling subsequent access to at least a portion of the reconfigured block.

Another embodiment includes a computer readable storage medium and/or system having instructions, logic, etc., stored thereon to manage defects in a memory system including one or more non-volatile memory devices. The instructions, and/or logic, when executed by at least one processor device of a respective computer, cause the at least one processor device to: receive notification of an access failure in a block of a non-volatile memory device, the block being one of multiple blocks in the non-volatile memory device, the block including a group of multiple memory elements to store data; split a band including the block into multiple sub-bands; and record settings information indicating the splitting of the band into the multiple sub-bands.

Note that any of the processing as discussed herein can be performed in any suitable order.

It is to be understood that the apparatus, system, method, apparatus, instructions on computer readable storage media, etc., as discussed herein also can be embodied strictly as a software program, firmware, as a hybrid of software, hardware and/or firmware, or as hardware alone such as within a processor device, within an operating system or a within a software application, etc.

Additionally, note that although each of the different features, techniques, configurations, etc., herein may be discussed in different places of this disclosure, it is intended, where suitable, that each of the concepts can optionally be executed independently of each other or in combination with each other. Any permutation of the disclosed features is possible. Accordingly, the one or more embodiments as described herein can be embodied and viewed in many different ways.

Note further that techniques herein are well suited for reconfiguring memory systems in response to detecting failures. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the embodiments herein are presented in the following claims.

The invention claimed is:

1. An apparatus comprising:
   failure detection firmware to produce a notification upon detection of an access failure in a block of a non-volatile memory device, the block being one of multiple blocks in the non-volatile memory device;
   defect management firmware to receive the notification of the access failure and, responsive to the notification, reconfigure a partitioning of the block to remedy the access failure; and
   configuration management firmware to store settings information of the reconfigured block, the settings information enabling subsequent access to at least a portion of the reconfigured block.

2. The apparatus as in claim 1, wherein the block resides in a band including multiple blocks, each of the multiple blocks in the band residing in a different non-volatile memory device; and
   wherein the defect management firmware, responsive to the notification, partitions the band into multiple sub-bands.

3. The apparatus as in claim 1, wherein defect management firmware partitions the block into at least a first sub-block and a second sub-block, the access failure occurring in the first sub-block; and
   wherein the defect management firmware retires the first sub-block from further use and configures the second sub-block for continued use to store data.

4. The apparatus as in claim 1, wherein the defect management firmware reconfigures the block into multiple sub-blocks and retires one of the multiple sub-blocks from further use.

5. The apparatus as in claim 1, wherein the defect management firmware verifies an ability to store data in the block at locations other than where the access failure occurred, the defect management firmware retiring only a portion of the block in response to detecting that accesses to at least a portion of the block function properly.

6. The apparatus as in claim 1, wherein the defect management firmware identifies a type of the access failure based on a counter value recording a number of accesses to the block and reconfigures the block depending on a magnitude of the counter value.

7. The apparatus as in claim 1, wherein the defect management firmware, responsive to detecting that a number of previous accesses to the block is below a threshold value, partitions the block into multiple sub-blocks and retires a portion of the block in which the failure occurred.

8. The apparatus as in claim 1, wherein the defect management firmware, responsive to detecting that the number of previous accesses to the block is above a threshold value, converts an operational mode of the block from a first bit-per-cell storage density mode to a second bit-per-cell storage density mode, the second bit-per-cell storage density mode storing fewer bits per cell than the first bit-per-cell storage density mode.

9. The apparatus as in claim 1, wherein the defect management firmware converts an operational mode of the block from a first bit-per-cell storage density mode to a second bit-per-cell storage density and splits a band in which the block resides into multiple sub-bands.

10. The apparatus as in claim 9, wherein the defect management firmware assigns the block, which has been converted to operate in the second bit-per-cell storage density mode, for use in one of the multiple sub-bands.

11. A computer system including the apparatus in claim 1, wherein the apparatus is an access manager, the computer system further comprising:
at least one processor device configured to communicate with the access manager to access the non-volatile memory device.

12. The computer system as in claim 11, wherein the non-volatile memory device is one of multiple non-volatile memory devices in a solid state drive to which the computer system has access through the access manager.

13. The computer system as in claim 1, wherein the block resides in a band in which a stripe of blocks reside; and
wherein the defect management firmware reconfigures the band into multiple sub-bands to partition the block.

14. The computer system as in claim 13, wherein the multiple sub-bands includes a first sub-band and a second sub-band, the access failure occurring in the first sub-band.

15. The computer system as in claim 14, wherein the settings information indicates that a portion of the block residing in the first sub-band has been retired and that a portion of the block residing in the second sub-band is available to store data.

16. The apparatus as in claim 1, wherein the defect management firmware splits a band in which the block resides into multiple sub-bands to remedy the access failure.

17. The apparatus as in claim 16, wherein the block is a first block in a first non-volatile memory device, the apparatus further comprising:
a second block, the second block residing in the band along with the first block, the second block residing in a second non-volatile memory device.

18. A method comprising:
detecting an access failure in a block of a non-volatile memory device, the block being one of multiple blocks in the non-volatile memory device;
responsive to detecting the access failure, reconfigure a partitioning of the block in the non-volatile memory device to remedy the access failure; and
store settings of the reconfigured block, the settings enabling subsequent access to at least a portion of the reconfigured block.

19. The method as in claim 18 further comprising:
identifying a band in which the block resides, the band including multiple blocks, each of the multiple block in the band residing in a different non-volatile memory device; and
partitioning the band into multiple sub-bands.

20. The method as in claim 18 further comprising:
reconfiguring the block into multiple sub-blocks;
identifying a sub-block of the multiple sub-blocks where the access failure occurred; and
retiring the identified sub-block from further use.

21. The method as in claim 18 further comprising:
changing an operational mode of the block from a first bit-per-cell storage density mode to a second bit-per-cell storage density mode, the second bit-per-cell storage density mode configuring a respective cell to store fewer bits per cell than the first bit-per-cell storage density mode; and
splitting a band in which the block resides into multiple sub-bands.

22. A method comprising:
receiving notification of an access failure in a block of a non-volatile memory device, the block being one of multiple blocks in the non-volatile memory device, the block including a group of multiple memory elements to store data;
splitting a band including the block into multiple sub-bands; and
recording settings information indicating the splitting of the band into the multiple sub-bands.

23. The method as in claim 22, wherein splitting the band further comprises:
partitioning the block into at least a first sub-block and a second sub-block, the access failure occurring in the first sub-block.

24. The method as in claim 23 further comprising:
recording status information indicating that the first sub-block in one of the multiple sub-bands has been retired from further access.

25. The method as in claim 22 wherein splitting the band includes:
partitioning multiple blocks residing in the band, each of the multiple blocks residing in a different non-volatile memory device.

26. The method as in claim 22 further comprising:
splitting the band into at least a first sub-band and a second sub-band, the access failure occurring in a portion of the block in the first sub-band; and
preventing further access to the portion of the block in the first sub-band.

27. The method as in claim 22 further comprising:
splitting the band subsequent to detecting that at least a portion of the block properly functions to store data.

28. The method as in claim 22 further comprising:
identifying a type of the failure based on a number of accesses to the block; and
partitioning the block into multiple sub-blocks and retiring a portion of the block in which the failure occurred in response to detecting that the failure is an infant mortality failure.

29. The method as in claim 22 further comprising:
retrieving status information indicating a number of accesses to the block; and
converting the block from a first bit-per-cell storage density mode to a second bit-per-cell storage density mode depending on the number of accesses.

30. The method as in claim 29 further comprising:
assigning the block, which has been converted into the second bit-per-cell storage density mode, for use in one of the multiple sub-bands.

31. The method as in claim 22, wherein splitting the band includes:
splitting multiple blocks residing in the band, each of the multiple blocks residing in a different non-volatile memory device and being set to operate in a first bit-per-cell storage density mode;
setting the block with the failure to operate in a second bit-per-cell storage density mode; and
setting the split multiple blocks to operate in the first bit-per-cell storage density mode.

32. The method as in claim 22 further comprising:
accessing status information indicating a number of defective memory elements in the block; and
splitting the band into multiple sub-bands in response to detecting that the number of defective memory elements in the block exceeds a defective memory element count threshold value.

33. Computer-readable storage hardware having instructions stored thereon, the instructions, when carried out by at least one processing device, cause the at least one processing device to perform operations of:
  receiving notification of an access failure in a block of a non-volatile memory device, the block being one of multiple blocks in the non-volatile memory device, the block including a group of multiple memory elements to store data;
  splitting a band including the block into multiple sub-bands; and
  recording settings information indicating the splitting of the band into the multiple sub-bands.

34. The computer readable storage hardware as in claim 33, wherein splitting the band includes:
  partitioning multiple blocks residing in the band, each of the multiple blocks residing in a different non-volatile memory device.

* * * * *